United States Patent Office 3,011,948
Patented Dec. 5, 1961

3,011,948
NEW ACTIVE SUBSTANCES AND PROCESS FOR THEIR ISOLATION
Ernst Gaeumann, Zurich, and Emil Hardegger, Lufingen, Zurich, Switzerland, assignors to Hoffmann-La Roche Inc., Nutley, N.J.
No Drawing. Filed June 2, 1958, Ser. No. 738,961
Claims priority, application Switzerland June 14, 1957
4 Claims. (Cl. 167—65)

This invention provides a process for the manufacture in pure form from orchid corms, bulbs or tubers, hereinafter referred to generally as tubers, preferably from *Orchis militaris* L., of substances which are active against fungi.

It is known that active substances are formed when orchid tubers are infected with mycorrhiza fungi, for example, with *Rhizoctonia repens* Bern. (cf. Gaeumann et al., Phytopathologische Zeitschrift 17 (1950), 36 et seq.).

The present invention is based on the observation that active substances can be prepared in pure form when orchid tubers which have been infected with *Rhizoctonia repens* Bern. and incubated, are extracted with organic solvents, the organic solvent removed from the extract, the residue extracted with a water-immiscible solvent, and the substances defined below, namely, Orchinol, Substance A, and Substance B, isolated from the extract.

The orchid tubers used as starting material are preferably those of the genus *Orchis militaris* L.; tubers of *Orchis morio* L. or of *Loro-glossum hiricinum* L. Rich. are also especially suitable. Prior to inoculation, the tubers are advantageously cleansed and disinfected, for example, with dilute corrosive sublimate solution, alcoholic chloramine solution or aqueous calcium hypochlorite solution, and cut up for example into slices. The tuber material is introduced into a sterile vessel and under sterile conditions the fungus *Rhizoctonia repens* Bern. added, preferably in the form of a spore suspension. The infected tubers are then incubated at a temperature of 20–35° C., preferably at 27° C., until the fungus is well developed and has formed a large quantity of mycelium. For this purpose about 10–14 days are required. The tuber substratum during this time becomes colored dark brown. After the incubation it is extracted with organic solvents, if desired, with addition of water. As organic solvents there can be used both those that are miscible with water, such as alcohols, for example, methanol or ethanol, low ketones, for example acetone, glycols and their ethers, for example propylene glycol, methyl Cellosolve or dioxane, and also those that are immiscible with water, such as benzene, ether, ethyl acetate or chloroform. Preferably the extraction is carried out in two stages. For the first there is used one of the specified organic solvents miscible with water, as a result of which at the same time a dehydration takes place. If necessary, the extraction is repeated with the same solvent, the material being extracted being advantageously further cut up between the extractions. For the second extraction stage is used one of the specified water-immiscible solvents. If desired there can be inserted between the two extraction stages a still further stage with a mixture of the solvents specified for use in the first and second stages described above. The combined extracts are evaporated to dryness, advantageously under vacuum; the residue is extracted by shaking, if desired after the addition of water, by means of a solvent immiscible with water such as ethyl acetate or ether. The aforementioned fungus-active substances can be isolated for example in this manner: An ethyl acetate extract obtained in this way is washed with alkali, for example with dilute sodium hydroxide solution, for removal of the acid constituents. The alkali-soluble substances exhibit only a slight activity. The main activity is present in the fraction remaining in the organic solution.

For splitting up, this fraction is freed from solvent and digested with an aromatic solvent, such as benzene or toluene, preferably with benzene, at room temperature. As a result a weakly active benzene-insoluble fraction remains, while practically the whole of the activity is present in the fraction soluble in benzene.

The benzene-soluble fraction can be separated into its active components in various ways, as by distribution between two immiscible phases or by adsorption. Chromatographic separation has proved to be advantageous, preferably on alumina. When, for example, for elution benzene, ether and a methanol-glacial acetic acid mixture are used, the following main fractions of approximately the same activity are obtained.

(A) A first benzene eluate which is an oil and which can be further separated by high vacuum distillation in a bulb tube. As most easily volatile substance cumarin is obtained at a bath temperature of 85° C., while the majority (75%) passes over at 135° C. This intermediate fraction is chromatographically uniform and is hereinafter called Substance A. It constitutes a yellowish oil; for analysis it is again distilled under high vacuum in a bulb tube at 135° C. $[\alpha]_D = +1.75°$ (c.=2 in alcohol).

Found: C, 76.81%, 76.63%; H, 11.13%, 11.20%.

The infra-red spectrum exhibits, among others, bands at 2940 cm.$^{-1}$, 2870 cm.$^{-1}$, 1735 cm.$^{-1}$, 1622 cm.$^{1-}$, 1587 cm.$^{-1}$, 1573 cm.$^{-1}$, 1473 cm.$^{-1}$, 1377 cm.$^{-1}$, 1355 cm.$^{-1}$, 1285 cm.$^{-1}$, 1185 cm.$^{-1}$, 1122 cm. $^{-1}$, 1102 cm.$^{-1}$, 1077 cm.$^{-1}$, 1058 cm.$^{-1}$, 1038 cm.$^{-1}$, 845 cm.$^{-1}$, 830 cm.$^{-1}$, 783 cm.$^{-1}$, 729 cm.$^{-1}$. The band at 1735 cm.$^{-1}$ indicates an aliphatic ketone or lactone or an aliphatic ester. A slight residue cannot be distilled without decomposition and is less strongly active against fungi.

(B) A second benzene eluate which for the most part crystallizes. After repeated crystallization, for example from benzene-cyclohexane or methanol-water, and chromatography, a pure, uniform crystallisate is obtained which has been given the provisional name Orchinol. Orchinol forms colorless prisms of M.P. 127° C. and can be sublimed undecomposed under high vacuum (at 160° C.).

Analysis indicates the empirical formula $C_{16}H_{16}O_3$.

$C_{16}H_{16}O_3$—Calc.: C, 74.97%; H, 6.29%; O, 18.74%. Found: C, 74.69%, 74.83%; H, 6.34%, 6.49%; O, 18.65%, 18.74%. Mol. wt.—Calc.: 256. Found: 233. Calc.: 2O—$CH_3$, 24–22%; 1 "H," 0.39%; 1C—$CH_3$, 5.87%. Found: 2O—$CH_3$, 23.29%; 1 "H," 0.41%; 1C—$CH_3$, 0.00%.

Two methoxy groups, no C—$CH_3$-groups, 1 active hydrogen atom and a hydroxyl group are present. The substance is optically inactive in benzene and in methanol. The infra-red spectrum (in KBr) exhibits, among others, bands at 3420 cm.$^{-1}$, 2950 cm.$^{-1}$, 2845 cm.$^{-1}$, 1610 cm.$^{-1}$, 1582 cm.$^{-1}$, 1500 cm.$^{-1}$, 1485 cm.$^{-1}$, 1450 cm.$^{-1}$, 1365 cm.$^{-1}$, 1342 cm.$^{-1}$, 1316 cm.$^{-1}$, 1295 cm.$^{-1}$, 1270 cm.$^{-1}$, 1245 cm.$^{-1}$, 1222 cm.$^{-1}$, 1203 cm.$^{-1}$, 1171 cm.$^{-1}$, 1158 cm.$^{-1}$, 1116 cm.$^{-1}$, 1082 cm.$^{-1}$, 1056 cm.$^{-1}$, 1032 cm.$^{-1}$, 995 cm.$^{-1}$, 927 cm.$^{-1}$, 866 cm.$^{-1}$, 842 cm.$^{-1}$, 832 cm.$^{-1}$, 813 cm.$^{-1}$, 746 cm.$^{-1}$, 731 cm.$^{-1}$, 720 cm.$^{-1}$. From this the presence of a strongly associated OH-group (3420 cm.$^{-1}$) is concluded and also of an aromatic system (1610 and 1500 cm.$^{-1}$). The ultra-violet spectrum of the substance dissolved in ethanol shows maxima at 212 m$\mu$ ($\epsilon$=26,700) and 280 m$\mu$ ($\epsilon$=21,700). The hydroxyl group of Orchinol is easily and quantitatively esterified, for example an O-acetyl and an O-p-bromobenzoyl derivative were obtained. Acetylation of Orchinol in pyridine with acetic anhydride at 20° C. gives in quantitative yield O-acetyl Orchinol; from methanol-water needles of M.P. 84° C.

$C_{18}H_{18}O_4$—Calc.: C, 72.46%; H, 6.08%; $2OCH_3$, 20.80%; mol. wt. 298. Found: C, 72.01%; H, 6.10%; $2OCH_3$, 20.42%; mol. wt. 300.

The infra-red spectrum (in KBr) exhibits, among others, bands at 2945 cm.$^{-1}$, 2840 cm.$^{-1}$, 1767 cm.$^{-1}$, 1602 cm.$^{-1}$, 1572 cm.$^{-1}$, 1502 cm.$^{-1}$, 1467 cm.$^{-1}$, 1437 cm.$^{-1}$, 1416 cm.$^{-1}$, 1370 cm.$^{-1}$, 1347 cm.$^{-1}$, 1325 cm.$^{-1}$, 1294 cm.$^{-1}$, 1280 cm.$^{-1}$, 1260 cm.$^{-1}$, 1205 cm.$^{-1}$, 1159 cm.$^{-1}$, 1121 cm.$^{-1}$, 1080 cm.$^{-1}$, 1060 cm.$^{-1}$, 1031 cm.$^{-1}$, 1013 cm.$^{-1}$, 1001 cm.$^{-1}$, 957 cm.$^{-1}$, 940 cm.$^{-1}$, 927 cm.$^{-1}$, 888 cm.$^{-1}$, 871 cm.$^{-1}$, 838 cm.$^{-1}$, 817 cm.$^{-1}$, 760 cm.$^{-1}$, 747 cm.$^{-1}$, 739 cm.$^{-1}$, 660 cm.$^{-1}$.

From Orchinol and p-bromobenzoyl chloride in pyridine at 20° C. O-p-bromobenzoyl-Orchinol is obtained. M.P. 139° C. after recrystallization from methanol.

$C_{23}H_{19}O_4Br$—Calc.: C, 62.88%; H, 4.36%. Found: C, 62.65%; H, 4.74%.

Methylation of Orchinol, e.g. with dimethyl sulfate yields the Orchinol methyl ether of melting point 83–86° C. (corr.).

$C_{17}H_{18}O_3$—Calculated: C, 75.53%; H, 6.71%. Found: C, 75.37%; H, 6.87%.

The mother liquors from the crystallization of Orchinol still show a certain activity.

No. 1 Whatman paper is used for the paper chromatography of Orchinol. A test portion of the benzene solution is put on the paper strip and a 1:1 mixture of methanol and water is used as a solvent system. For development the paper is dried and sprayed, first with a 0.1% ethanolic solution of dichloroquinone-chloramide, and then with a saturated aqueous borax solution. After drying, the Orchinol appears as a grey-green spot at $Rf$ 0.56. For definite proof, the chromatographed test portion should contain at least 10γ of Orchinol. Systems of lipophilic solvents (e.g. benzenecyclohexane) with $Rf$ values around 0.5 are also useful for this paper chromatographic test.

(C) An ether eluate which after another chromatography on alumina of activity II gives in small yield a crystalline fraction hereinafter called Substance B, with the same activity. This cannot be sublimed undecomposed under high vacuum and can be purified by recrystallization, for example from methanol-water. It has a melting point of 113° C. and is optically inactive. The infra-red spectrum (in KBr), exhibits, among others, bands at 3400 cm.$^{-1}$, 3140 cm.$^{-1}$, 1910 cm.$^{-1}$, 1617 cm.$^{-1}$, 1600 cm.$^{-1}$, 1520 cm.$^{-1}$, 1460 cm.$^{-1}$, 1389 cm.$^{-1}$, 1357 cm.$^{-1}$, 1322 cm.$^{-1}$, 1293 cm.$^{-1}$, 1240 cm.$^{-1}$, 1226 cm.$^{-1}$, 1211 cm.$^{-1}$, 1174 cm.$^{-1}$, 1110 cm.$^{-1}$, 995 cm.$^{-1}$, 942 cm.$^{-1}$, 836 cm.$^{-1}$, 800 cm.$^{-1}$, 750 cm.$^{-1}$, 715 cm.$^{-1}$. From this the presence of an OH group and probably of an aromatic system (1600 and 1520 cm.$^{-1}$) can be concluded. The ultra-violet spectrum of the substance dissolved in ethanol shows maxima at 278 mμ (ε=1700) and 226 mμ (ε=9240). The molecular weight, determined in camphor, is 141. Elementary analysis gives

| | Percent |
|---|---|
| C | 70.32 |
| H | 6.90 |

(D) A methanol-glacial acetic acid eluate (30:1).

The Orchinol can also be isolated in this manner: The above-mentioned ethyl acetate extract, which has been treated with alkali, is evaporated, and the residue extracted with ether. The ethereal solution is then extracted with an aqueous alkali hydroxide, such as caustic hydroxide solution. The alkaline solution is then acidified and extracted with a solvent immiscible with water, such as ether. On evaporation of the ethereal solution, the Orchinol defined above is obtained. The ether solution contains after extraction with alkali the active Substances A and B described above.

The described substances are active against fungi. For example Orchinol exhibits the following activities.

Using a dilution series as test method it is ascertained that the germination of spores of Rhizoctonia repens is reduced to 50% by a concentration of 70γ/cc., of Alternaria tenuis by a concentration of 100γ/cc.

The following examples illustrate the invention:

Example 1

10 kg. of tubers of Orchis militaris L., washed with water, are immersed for 3 minutes in an 0.1% corrosive sublimate solution and then washed with sterile distilled water. The tubers are then cut into slices under sterile conditions and the slices introduced into sterilized Glaxo flasks until the latter are one third full and then inoculated with a spore suspension of Rhizoctonia repens Bern. The flasks are incubated for 10–14 days at 27° C. as a result of which the fungus becomes well developed and a white mycelium formed, while the tuber substratum becomes dark brown colored. After the incubation, the tuber slices are immersed in 96% ethanol and allowed to stand for 24 hours at room temperature, whereupon the ethanol is poured off. The slices are then mechanically cut up and extracted at room temperature for 3 days each, first with ethanol, then twice with a mixture of ethanol and ether (2:1) and finally with ether, the solvent in each case being poured off.

The alcohol and ether extracts are combined and concentrated under vacuum at 40° C. until a brown oil commences to separate. The resulting concentrate is then diluted with the same volume of water and extracted by shaking three times with ethyl acetate, whereby the total fungus activity passes into the organic phase. The combined ethyl acetate extracts, with ice cooling, are extracted three times in each case with 2 N-potassium bicarbonate, 2 N-sodium carbonate and 2 N-caustic soda solution, washed with water, dried over sodium sulfate and evaporated to dryness under vacuum at 35° C. The residue is digested three times with cold benzene, whereby insoluble inactive constituents can be separated. The benzene-soluble fraction weighs 9.4 grams and contains the majority of the activity.

By acidification of the above mentioned potassium bicarbonate, sodium carbonate and sodium hydroxide extracts and extraction there are obtained the corresponding acid constituents which weigh respectively 6.0 grams, 4.2 grams and 5.2 grams and also contain a fraction of the fungus activity.

2 grams of the resulting benzene-soluble fraction are dissolved in benzene and chromatographed on 75 grams of alumina (activity IV according to Brockmann), elution taking place with benzene, ether and finally with a methanol-glacial acetic acid mixture (30:1). Four main fractions are obtained which all possess fungus activity:

Fraction A, oily benzene eluate, 0.54 gram
Fraction B, partially crystalline benzene eluate, 0.55 gram
Fraction C, partially crystalline ether eluate, 0.40 gram
Fraction D, methanol-glacial acetic acid (30:1) eluate, 0.40 gram 0.36 gram of Fraction A is distilled in a bulb tube under high vacuum. By this means three fractions are obtained:

(a) At a bath temperature up to 85° C. a colorless oil which crystallizes on cooling. After recrystallizing from petroleum ether it melts at 67° C. and is identical with cumarin.

(b) At a bath temperature up to 135° C. Substance A as a yellowish oil; $[\alpha]_D = +1.75°$ (c.=2 in ethanol). Analysis.—C, 76.81%; H, 11.13%. It possesses fungus activity.

(c) A distillation residue which still exhibits a certain activity against fungi.

0.40 gram of Fraction B is recrystallized first from a benzene-cyclohexane mixture and then from methanol-water. By this means the fungus-active Orchinol is obtained in the form of colorless prisms of M.P. 127° C.

which sublime under high vacuum at 160° C. without decomposition. $[\alpha]_D \pm 0°$ (c.=3 in benzene or methanol). Microanalytical data indicate a formula $C_{16}H_{16}O_3$, with two methoxy groups and one active hydrogen atom. In the infra-red spectrum bands are observed at 3420 cm.$^{-1}$ (associated with OH-group) and at 1610 and 1500 cm.$^{-1}$ (aromatic system).

The mother liquors still show a certain activity against fungi.

On treatment with pyridine and acetic anhydride at 20° C., Orchinol forms a monoacetate $C_{18}H_{18}O_4$ of M.P. 84° C.; colorless needles from methanol-water.

By the action of p-bromobenzoyl chloride upon Orchinol in pyridine at 20° C. O-p-bromobenzoyl Orchinol $$C_{23}H_{19}O_4Br$$

is obtained of M.P. 139° C. (from methanol).

The Orchinol methyl ether is obtained as follows: On the water bath, 340 mg. of Orchinol and a small amount of water are stirred to form a magma. On the addition of a few drops each of 4 N-KOH and dimethyl sulfate, the mixture liquefies. After that, while stirring, repeated alternating additions are made of some 4 N-KOH and dimethyl sulfate. The solution which is always alkaline, is kept at 80° C. for 45 minutes and then allowed to cool. The mixture is extracted with benzene, the benzene washed with water and evaporated. The brownish residue crystallizes. The preparation is chromatographed over alumina (activity II) with benzene as eluting agent. M.P. 83–86° C. (corr.). Yield, 298 mg. (83%).

$C_{17}H_{18}O_3$—Calculated: C, 75.53%; H, 6.71%. Found: C, 75.37%; H, 6.87%.

Unlike Orchinol, this substance shows no band at 3400 cm.$^{-1}$ in the IR spectrum.

0.30 gram of Fraction C is chromatographed on 17 grams of alumina (activity II). By this means with a methanol-chloro form (1:1) mixture, a fungus-active fraction Substance B, is eluted which crystallizes from methanol-water in needles of M.P. 113° C. *Analysis.*—C=70.32%; H=6.90%.

For treating of the sensitivity of the active substances with respect to acids, bases and high temperatures, portions of 100 mg. each of the benzene-soluble fraction were dissolved in 2 N-hydrochloric acid and 2 N-sodium hydroxide solution and a little methanol. After 24 hours standing at room temperature the fungus-activity was still completely retained.

A further 100 mg. of the benzene-soluble fraction were boiled in 5 cc. of dioxane for 1 hour under reflux without destruction of the activity.

By directly extracting as described above 10 kg. of tubers of *Orchis militaris* L. without previous infecting and incubation, extracts are obtained which are inactive.

The protective substances obtained according to the above process, especially the Orchinol, can also be used as protecting agents against fungi for plants.

*Example 2*

The ethyl acetate extract mentioned in Example 1, which has been washed with alkali, then dried and evaporated, is extracted with ether and triturated thoroughly. The resulting ethereal solution is extracted three times with 2 N-sodium hydroxide solution. The alkaline solution is acidified and extracted with ether. On evaporation of the dried ethereal solution, the Orchinol is obtained in good yield. The ether solution contains after extraction with alkali the active Substances A and B described above.

What is claimed is:

1. A process for the production and isolation of a crystalline, optically inactive compound having the following properties: empirical formula $C_{16}H_{16}O_3$ with two methoxy groups, a hydroxy group and an active hydrogent atom; melting point 127° C.; maxima at 212 m$\mu$, E=26,700, and 280 m$\mu$, E=21,700, in the ultra-violet spectrum; absorption bands in the infra-red spectrum at 3420 cm.$^{-1}$, 2950 cm.$^{-1}$, 2845 cm.$^{-1}$, 1610 cm.$^{-1}$, 1582 cm.$^{-1}$, 1500 cm.$^{-1}$, 1485 cm.$^{-1}$, 1450 cm.$^{-1}$, 1365 cm.$^{-1}$, 1342 cm.$^{-1}$, 1316 cm.$^{-1}$, 1295 cm.$^{-1}$, 1270 cm.$^{-1}$, 1245 cm.$^{-1}$, 1222 cm.$^{-1}$, 1203 cm.$^{-1}$, 1171 cm.$^{-1}$, 1158 cm.$^{-1}$ 1116 cm.$^{-1}$, 1082 cm.$^{-1}$, 1056 cm.$^{-1}$, 1032 cm.$^{-1}$, 995 cm.$^{-1}$, 927 cm.$^{-1}$, 866 cm.$^{-1}$, 842 cm.$^{-1}$, 832 cm.$^{-1}$, 813 cm.$^{-1}$, 746 cm.$^{-1}$, 731 cm.$^{-1}$, 720 cm.$^{-1}$, and which shows the presence of a considerably associated OH group and an aromatic system; O-acetyl derivative with empirical formula $C_{18}H_{18}O_4$, melting point 84° C.; O-p-bromobenzoyl derivative with empirical formula $C_{23}H_{19}O_4Br$, melting point 139° C.; methyl ether with empirical formula $C_{17}H_{18}O_3$, melting point 83–86° C.; which comprises infecting orchid tubers with fungi of the species *Rhizoctonia repens* Bern., incubating the infected orchid tubers at a temperature within the range of about 20 to 35° C. until the fungus is well developed and has formed a large quantity of mycelium, extracting the orchid tubers first with an organic solvent miscible with water and then with a water-immiscible organic solvent, combining the extracts and removing the solvents, extracting the residue with ethyl acetate, washing the ethyl acetate extract with aqueous alkali, removing the solvent, extracting with an organic solvent immiscible with water, passing the resulting extract through a chromatographic column containing alumina, eluting the column with benzene, collecting a first benzene eluate containing an oil, and collecting a second benzene eluate containing said crystalline, optically inactive compound.

2. Process according to claim 1, wherein tubers of *Orchis militaris* L. are used as starting material.

3. Process according to claim 1, wherein the orchid tubers are disinfected prior to being infected with *Rhizoctonia repens* Bern.

4. Process according to claim 1, wherein the tuber material is extracted first with alcohol, then with a mixture of alcohol and ether, and finally with ether alone.

References Cited in the file of this patent

Florey et al.: "Antibiotics," pub. 1949 by Oxford University Press, pp. 583, 1584 and 1633.

Chem. Abstracts, vol. 16, 1922, pp. 273 and 1447, vol. 13, page 1481, 1919.

Gaeumann et al.: Phytopathologische Zeitschrift 17 (1950), 36, cited by applicants.

Chem. Abst. Collected Formula Index 1920–1946, pp. 252–253.

Gaemann et al.: Phytopathologische Zeitschrift, July 1950, pp. 37–62, page 48, esp. pert.